(12) United States Patent
Cooper

(10) Patent No.: US 6,511,010 B1
(45) Date of Patent: Jan. 28, 2003

(54) OPTICAL FIBER MANAGEMENT INSTALLATION APPLIANCE

(75) Inventor: Brian Cooper, Bedford, NH (US)

(73) Assignee: Flextronics International, Oakland, NJ (US)

(*) Notice: Subject to any disclaimer, the term of this patent is extended or adjusted under 35 U.S.C. 154(b) by 0 days.

(21) Appl. No.: 09/898,960

(22) Filed: Jul. 3, 2001

(51) Int. Cl.[7] .................. B65H 75/44; B65H 75/14; G02B 6/00
(52) U.S. Cl. ............... 242/400.1; 242/118.41; 242/608.8; 242/609.1; 242/609.4; 242/610.6; 385/135
(58) Field of Search ............ 242/400.1, 598.3, 242/599.3, 608.8, 609, 609.1, 609.2, 609.4, 610.6, 118.41; 385/135

(56) References Cited

U.S. PATENT DOCUMENTS

| | | | |
|---|---|---|---|
| 351,816 A | * | 11/1886 | Thorne ................. 242/609.1 X |
| 2,533,307 A | * | 12/1950 | Amos et al. .......... 242/599.3 X |
| 4,696,438 A | | 9/1987 | Myers |
| 5,071,082 A | | 12/1991 | Lefevre et al. |
| 5,661,840 A | * | 8/1997 | Caveney ................. 385/135 |
| 5,702,066 A | | 12/1997 | Hurst et al. |
| 5,703,990 A | * | 12/1997 | Robertson et al. ........ 385/135 |
| 5,934,606 A | * | 8/1999 | Guild ................. 242/609.2 X |
| 5,971,316 A | | 10/1999 | Kim |
| 6,007,018 A | | 12/1999 | Pottegier et al. |
| 6,131,845 A | | 10/2000 | Burlingame et al. |
| 6,175,079 B1 | | 1/2001 | Johnston et al. |

FOREIGN PATENT DOCUMENTS

FR 2 570 196 A1 * 3/1986 ............. 385/135 X

* cited by examiner

*Primary Examiner*—Kathy Matecki
*Assistant Examiner*—Minh-Chau Pham
(74) *Attorney, Agent, or Firm*—Maine & Asmus

(57) ABSTRACT

An apparatus and method for managing excess lengths of installed fiber optic cable. The apparatus is a specially designed routing spool that allows for optic fiber cables to be wrapped in individual slots of suitable radius to provide separation of cables and prevent kinking and microbends, and to allow easy access to the fiber cables if it is necessary to perform maintenance or to replace cables.

19 Claims, 7 Drawing Sheets

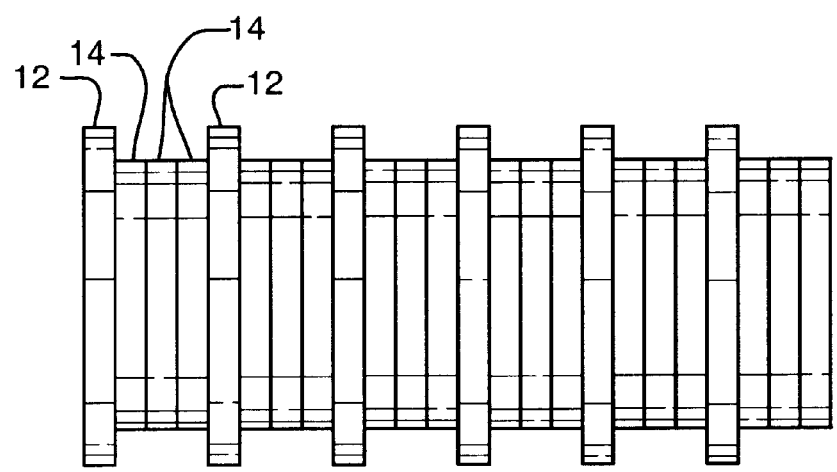
FIG. 8
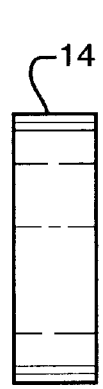
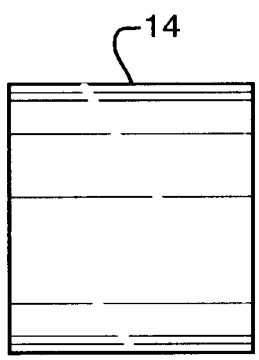
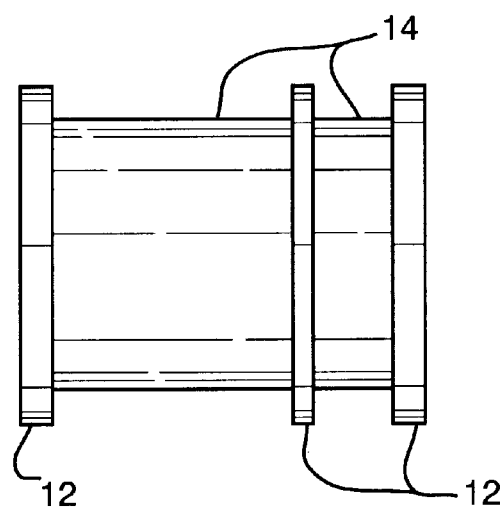
FIG. 9      FIG. 10      FIG. 11

OPTICAL FIBER MANAGEMENT INSTALLATION APPLIANCE

FIELD OF THE INVENTION

This invention relates to installation appliances for use with optic fiber, more particularly to such appliances that are spools having individual pockets for receiving such fiber.

BACKGROUND

Optic fibers are becoming an increasingly important transmission medium in high-speed electronic applications. Optic fiber is an extremely delicate material, however, and significant care must be taken in the handling of these fibers to prevent breakage, microcurves, and other distortions in the fiber that would inhibit transmission of data. Maintaining proper minimum fiber radii is an especially important aspect of optic fiber care. Bending the fiber below a minimum fiber radius can result in permanent damage to the fiber and in transmission losses. Fibers cannot be bent sharply into right angles and excess fiber in installations must be managed to avoid this damage.

Devices dealing with fiber bending and control issues have arisen primarily in regard to the field of optical fiber storage and shipping. Known methods of dealing with these issues include the use of traditional or slightly modified spools to minimize the bend in the fiber and the non-linearity that would result from such bends. Storage spools, as a result of their use as storage equipment have had to compromise ease of fiber maintenance to obtain greater capacity, some in excess of 200 m of fiber, arranging the fiber in multiple arrays, coiled one upon another. The issue of minimum bend radius is not exclusive to these large scale applications, but is also present in more confined conditions, for instance, connections between devices, such as related pieces of test equipment mounted in close proximity to each other, as in common or adjacent racks.

The following references may provide useful context for understanding the current state of the underlying technology.

Known spools may be composed of material designed to prevent thermal expansion and contraction that would damage the fiber.

One known solution to the problem of storing optic fibers without damage is to introduce slack into the fibers or padding the spool to prevent the fiber from being wound too tightly. There are various known means that have been used for introducing slack into the fiber to prevent it from being forced against the cylinder of the spool, from foam padding as in Myers U.S. Pat. No. 4,696,438 and Kim U.S. Pat. No. 5,971,316 to removable stays as in Lefevre U.S. Pat. No. 5,071,082. Myers '438 uses a thin, 0.48 cm, layer of foam on a spool. Kim '316 used foam pads and external shields on the barrel of the spool to absorb shock to the fiber that might occur in transport. Lefevre '082 disclosed the use of a spool with indentations hollowed out along the barrel to accept rods that could be removed after the winding of the fiber, decreasing the tension.

Other known storage spool assemblies such as that disclosed U.S. Pat. No. 5,702,066 to Hurst, use clips to prevent the optic fiber from being forced against the barrel of the spool, thereby protecting against excessive bending or need to use fasteners such as tape or twist ties to keep the fiber from tangling or twisting. Such tangles and twists are to be avoided as they too might introduce microbends or kinks in the optic fiber.

Other known means of protecting optic fibers stored on spools from microbends and kinks include the development of means for more effectively winding the fiber on such a spool. Such variations include the development of bevels and groves in ancillary machines to guide the fiber during the winding process. Other external guide machines have been developed.

These spool storage technologies are not intended for holding live, signal carrying optic fibers between terminal devices. They fail to individually separate wraps of fiber for maintenance or replacement of individual fibers. Their construction is complicated by the multiplicity of the parts that they are comprised of, the materials they are composed of, and the complexity of their shapes.

Known systems have been used for the management of electrical and telephonic wires and fibers in field installations. These include the use of half spools 8, (FIG. 2) mounted perpendicularly to a flat surface 9 such as a wall, and more complicated wall mounted cabinets such as that disclosed in U.S. Pat. No. 6,175,079 to Johnson, that contains expandable spool sections and clips for controlling optical fiber. Half spools do not offer the same protection to the fiber and have similar disadvantages to storage spools. They fail to adequately control the fiber, allowing for damage, and do not allow the same orderly and easy maintenance of the fibers and a separated single fiber path. The difficult manufacture of more complex apparati, make such articles more costly, and installation, maintenance, and replacement more difficult.

Clearly a simple, relatively inexpensive, means for taking up excess optic fiber and properly managing and protecting that fiber, in which that fiber is readily accessible is necessary for use as an installation appliance in the fiber optic field.

SUMMARY OF THE INVENTION

It is an object of the invention to provide an installation appliance for preventing bends and damage in optical fiber installations, caused by bends in the fiber tighter than the minimum radius.

It is a further object of the invention to provide a means for controlling lengths of optical fiber longer than necessary for the terminal connections required.

It is yet further object of the invention to provide an installation appliance of spool like shape with individual channels for each coil of optical fiber.

It is another object of the invention to provide a means of facile service and maintenance of installed optical fiber.

Still other objects and advantages of the present invention will become readily apparent to those skilled in this art from the following detailed description, wherein I have shown and described only a preferred embodiment of the invention, simply by way of illustration of the best mode contemplated by me on carrying out my invention.

BRIEF DESCRIPTION OF THE DRAWINGS

FIG. 8 is a side perspective view of a second embodiment.

FIG. 9 is a side perspective view of a first alternate spacer ring.

FIG. 10 is a side perspective view of a second alternate spacer ring.

FIG. 11 is a side perspective view of a third embodiment, employing the spacer rings of FIGS. 9 and 10.

DETAILED DESCRIPTION OF THE PREFERRED EMBODIMENT

Figure 1:
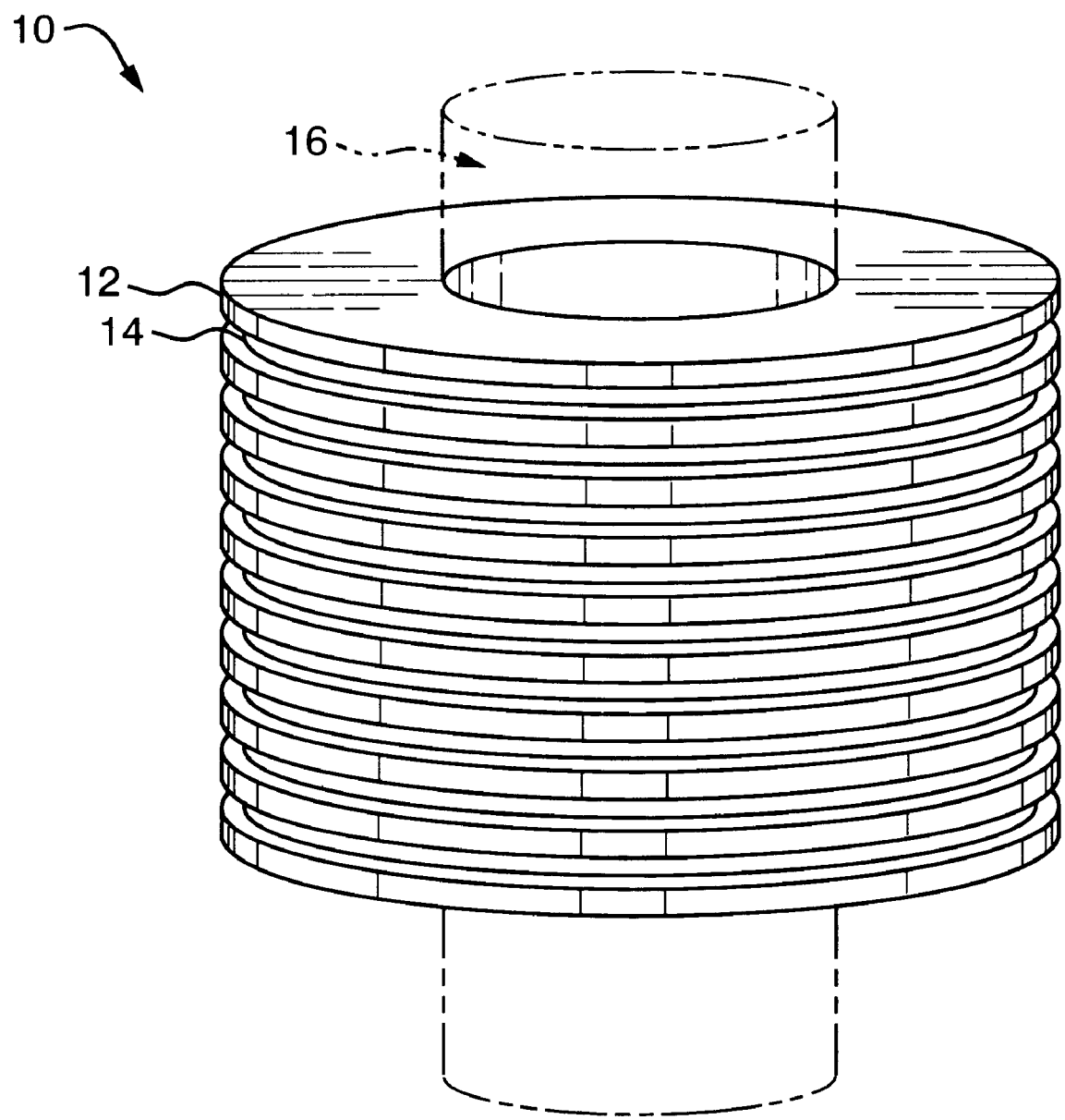
FIG. 1 is a perspective view of an optical fiber routing spool according to a first preferred embodiment of the invention.
Figure 2:
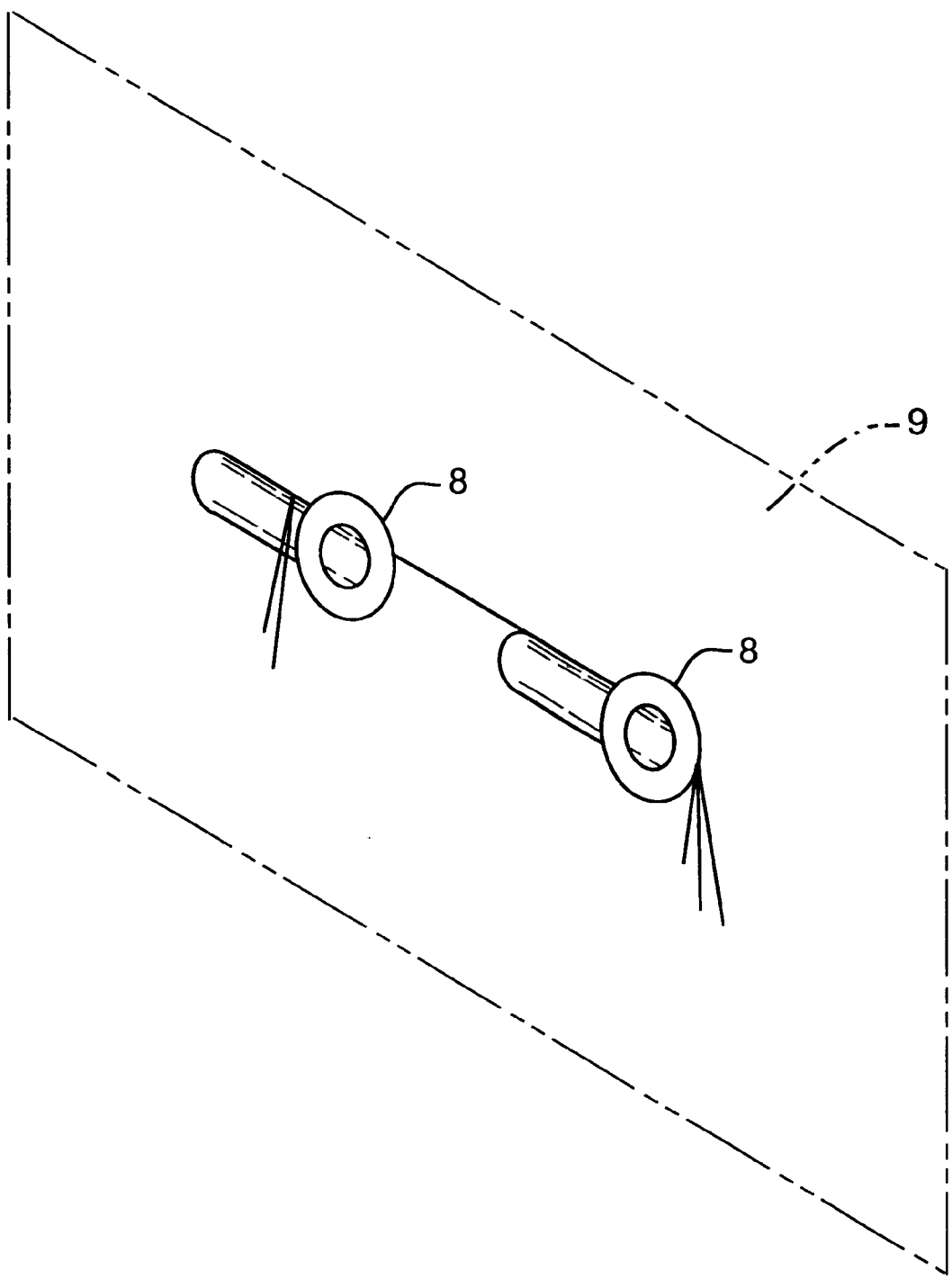
FIG. 2 is a perspective view of a pair of prior art half spool wire management appliances, the smaller end of which is generally fastened to the wall or board proximate to the terminal locations.
Figure 3:
FIG. 3 is a top plan view of a spacer ring of the embodiment of FIG. 1.
Figure 4:
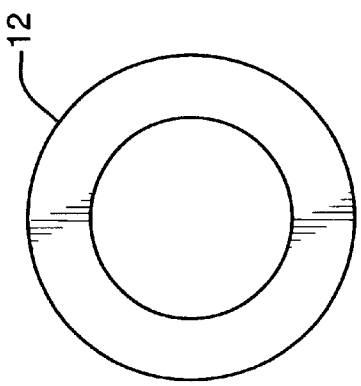
FIG. 4 is a side elevation view of a spacer ring of FIG. 3.
Figure 6:
FIG. 6 is a side elevation view of the partition ring of FIG. 5.
Figure 5:
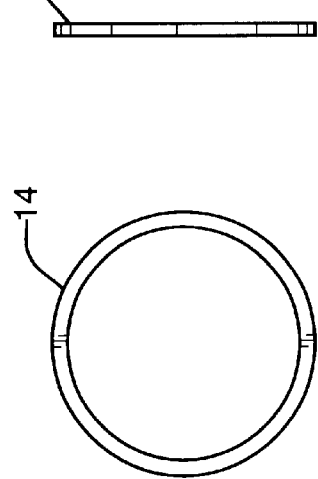
FIG. 5 is a top plan view of a partition ring of the embodiment of FIG. 1.
Figure 7:
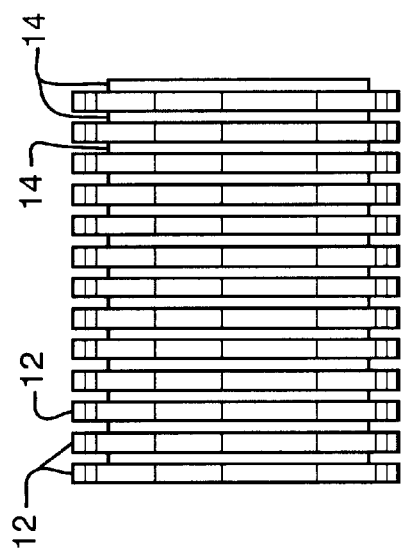
FIG. 7 is a side elevation view of the preferred of the embodiment of FIG. 1.
Figure 12:
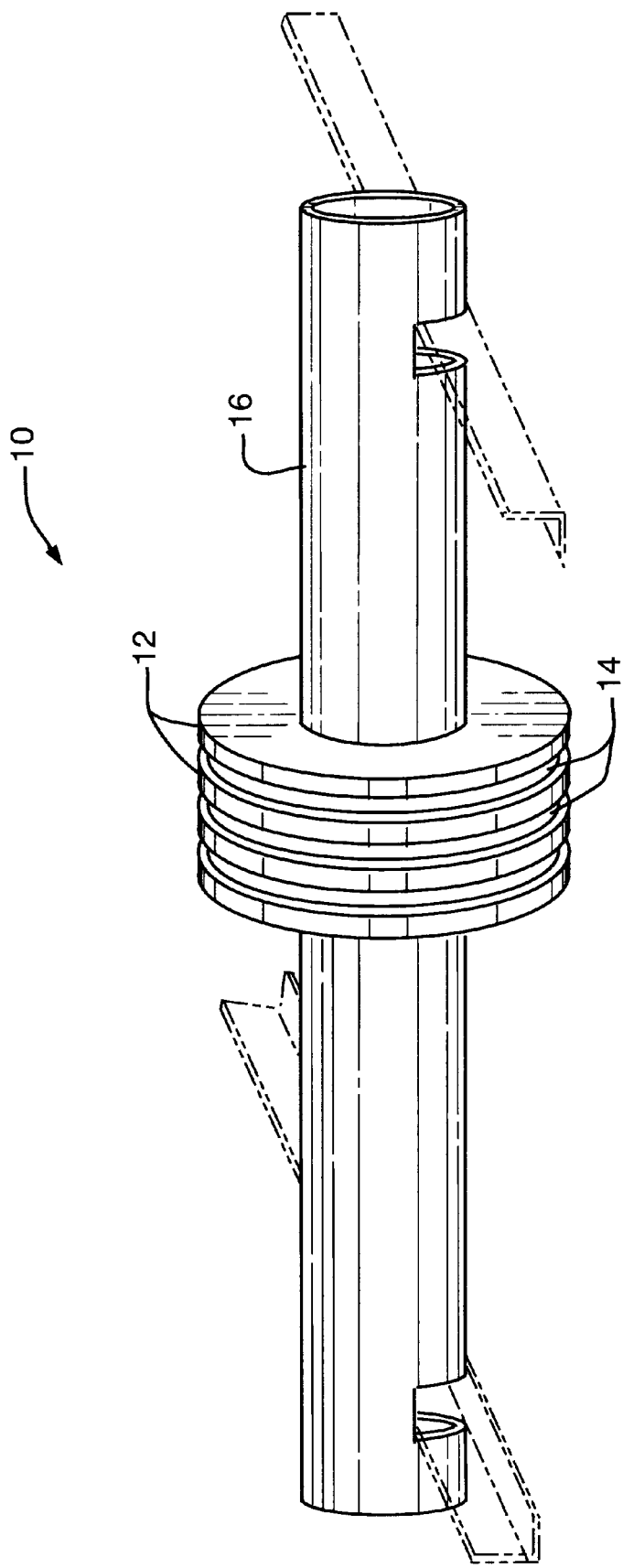
FIG. 12 is a side perspective view of a fourth referred embodiment mounted on the rails of an equipment rack.
Figure 13:
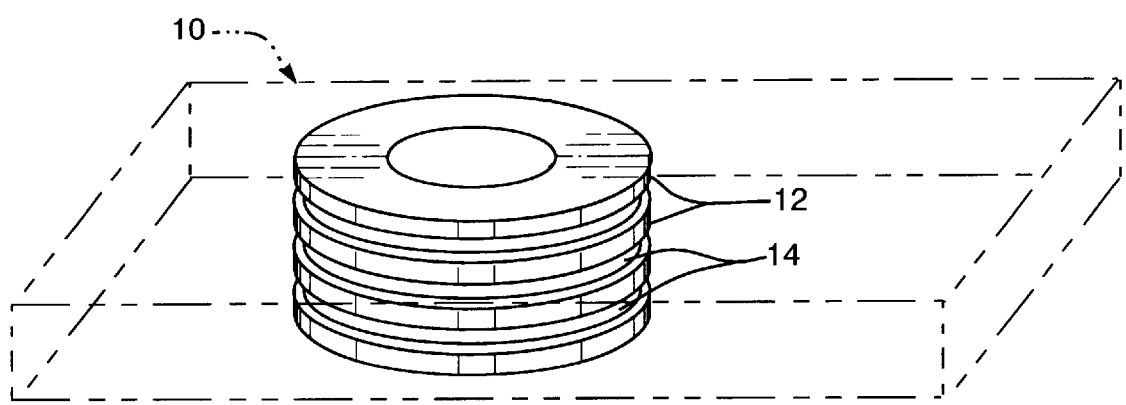
FIG. 13 is a side perspective view of a fifth embodiment of a fiber optic mounting spool mounted in a drawer of an equipment rack.

In a preferred embodiment of an optical fiber installation appliance as illustrated by FIGS. 1 and 7, the fiber optic spool 10 is composed of large three-dimensional spacer rings 12 and smaller three-dimensional spacer rings 14 arranged coaxially along a piece of pipe or other cylinder 16. In this embodiment, the cylinder is a standard 2 inch diameter pipe of Polyvinyl chloride plastic. The large rings 12 alternate with the smaller rings 14 to form a cylinder with ridges perpendicular to its axis.

Both the large rings 12, and the smaller rings 14 are, in the preferred embodiment, are composed of PORON®, a high density microcellular polyurethane physical characteristics suitable for the application, thereby allowing it to maintain its rigidity and allowing the optical fiber to be held firmly, but not stressed, thereby preventing micro-curvature, kinking, or bends tighter than the minimum fiber bend radius. Materials other than PORON® having uniform microcellular structure and densities of approximately 15 lbs/ft³ (240 kg/m³) and a compression force deflection 4–8 psi (27–55 kPa) are numerous and equally suitable for the application. No claim is made to the trademark PORON®, which is a registered trademark of the Rogers Corporation of Woodstock, Conn. The foam is substantially smooth on both the top and bottom. Both rings (12,14) may be manufactured using a die punch.

In the preferred embodiment the rings are assembled into segments approximately three inches (3 in.) thick. These segments can then in turn be proximally disposed to accommodate routing of lengths of fiber in equipment installations.

The appliance, in its several embodiments is typically mounted behind one or the other, or both of several pieces of equipment having optical cable terminations. A mounting spindle or tube and brackets attached to the equipment rack frame or side wall is a suitable mounting methods. The appliance is normally mounted in a non-rotable manner, but a rotable mounting is not precluded. The appliance can also be mounted in a drawer without the use of a mounting spindle, instead the three inch section is merely fixed on the bottom or side of the drawer. Other embodiments of the invention may not be mounted, but may be suspended by the cables themselves.

The height of the smaller ring 14 determines the diameter of the optic fiber that may be would on the appliance. As illustrated by figures 9, 10, and 11 the spacer ring 14 may be replaced with a spacer ring manufactured from thicker foam, thereby allowing the gap formed by the spacer ring 14 to accommodate a fiber of greater diameter. This effect can also be achieved by combining a plurality of the spacer rings 14, as illustrated in FIG. 8.

When in use, optical fiber is wrapped around the spool, in the grooves left by the smaller spacer rings 14. The placement of individual fibers in separate groove said maintenance by allowing for ease of access to the fibers if maintenance or replacement is required once the appliance and fiber are installed. Such an orderly array also aids in the management of large numbers of such fibers, thereby decreasing the complexity arising from an expanded number of fibers.

The invention is susceptible of other and various embodiments. For example, there is within the scope of the invention, an optic fiber installation appliance consisting of smaller space rings having height, and a central hole, having a radius, stacked alternately with larger partition rings. Those spacer and partition rings may have central holes having a common radii. The central holes are may be aligned coaxially. Radii of the rings may be greater than approximately two (2) inches. The optic fiber installation appliance may also have a mounting member extending through the central holes. That mounting member may be a pipe, possibly a polyvinyl chloride pipe. The mounting means may be adapted using mounting brackets on its first and second ends. The mounting brackets may be non-rotatably fixed on the ends of the mounting member. The mounting brackets may be attachable to an equipment rack frame. The mounting brackets may also be attachable to one or more walls of an equipment rack. Rings may be composed of a high density microcellular polyurethane. That high density microcellular polyurethane may have a density of 15 lbs/ft³ (240 kg/m³) and a compression force deflection of 4–8 psi (27–55 kPa) such as PORON®.

Figure 14:
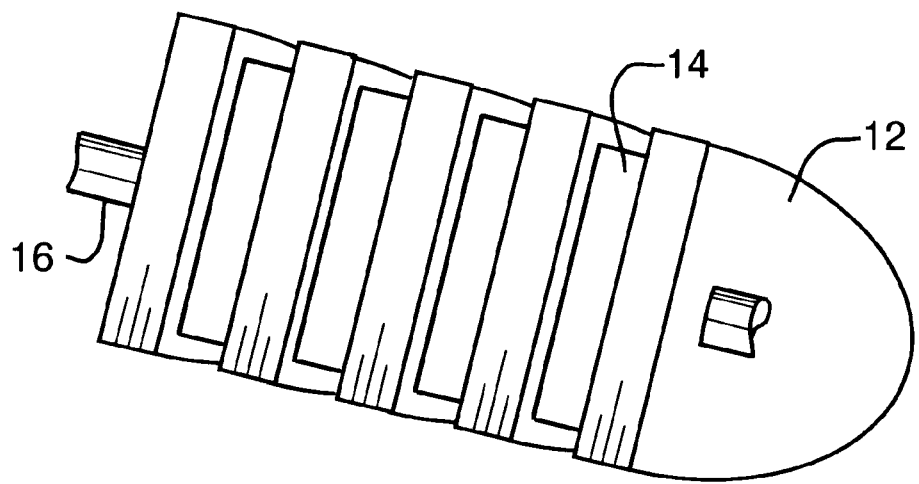
FIG. 14 illustrates an embodiment with a parabolic cross-section.
Figure 15:
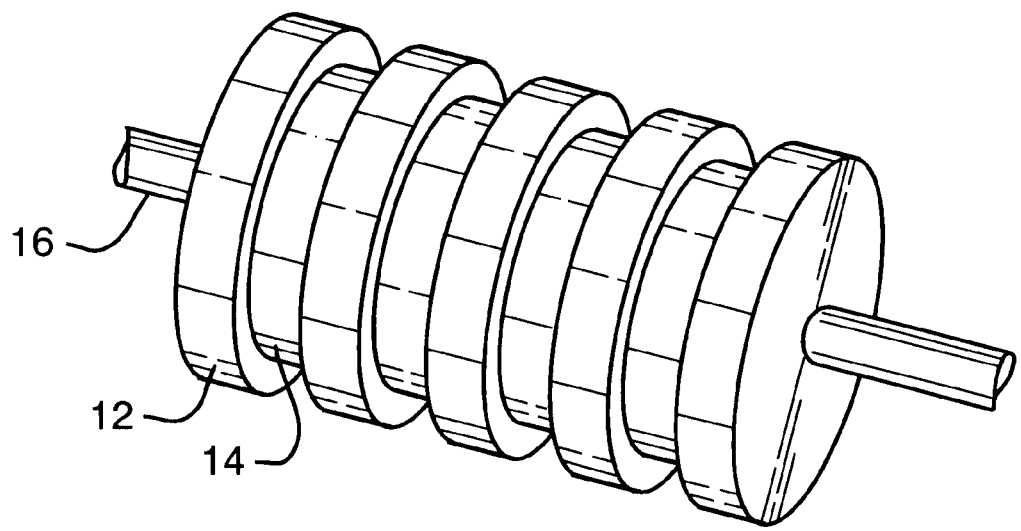
FIG. 15 illustrates an embodiment with an oval cross-section.

For another example, there is also within the scope of the invention an optic fiber installation appliance produced by a process comprising the steps of: cutting from a sheet material an oval, circle, parabola, ring or ellipse; cutting from the material a second shape, also selected from the group, but of larger area than the first shape; alternately stacking the first and the two shapes and aligning the shapes coaxially. The optic fiber installation appliance thus created may also have a hole cut in the center of the shapes. The process for making the appliance may also include the step of inserting a mounting member into the hole. That mounting member may be a pipe adapted to be attachable to an equipment rack. Two of these alternative embodiments are illustrated in FIGS. 14 and 15. FIG. 14 illustrates making the larger rings 12 and the smaller rings 14 parabolic in shape. It would be clear to one skilled in the art that fiber would only be partially wrapped or laid only on the curved side of this embodiment, to avoid the sharp corners defining the baseline of the parabolic shape. FIG. 15 illustrates making the larger rings 12 and the smaller rings 14 elliptical in shape. It will be readily apparent in this embodiment that the smaller radius ends of the ellipsoid must be at least the minimum radius required for protecting the optical cable.

A further example is a method of installing optical fiber in equipment installations including the steps of arranging one or more foam spacer rings having alternately with one or more foam partition rings, the rings having central holes; aligning those rings coaxially by central holes; securing the rings as a unitary assembly; positioning the assembly proximate to the equipment installation; wrapping a length of optical fiber around the spacer rings, between the partition rings wherein the ends of the optical fiber are connectable to the intended terminal connections. That method can also include the steps of introducing a mounting member through the central holes; mounting the assembly on an equipment rack frame; wrapping at least one optic fiber at least partially around an external edge of the assembly; maintaining at least one foam partition ring between each optical fiber.

The objects and advantages of the invention may be further realized and attained by means of the instrumentalities and combinations particularly pointed out in the appended claims. Accordingly, the drawing and description are to be regarded as illustrative in nature, and not as restrictive.

I claim:

1. An optic fiber installation appliance comprising:

smaller spacer rings having an outside radius, height, and a central hole, said smaller spacer rings stacked alternately in axial alignment with larger partition rings having a larger outside radius, height, and a central hole, said appliance being attachable in a stationary manner to an equipment rack, each said smaller spacer ring available for disposing at least partially around thereon a length of optic fiber cable, at least one end of said cable being connected to a cable terminal connection.

2. An optical fiber installation appliance as in claim 1 wherein said spacer rings and said partition rings have central holes having a common radii and being coaxially aligned.

3. An optic fiber installation appliance as in claim 2 wherein said radii are greater than approximately two (2) inches.

4. An optic fiber installation appliance as in claim 2 further comprising a mounting member extending through said central holes.

5. An optic fiber installation appliance as in claim 4 wherein said mounting member comprises a pipe attachable to said equipment rack.

6. An optic fiber installation appliance as in claim 5 wherein said pipe is composed of polyvinyl chloride.

7. A fiber optic fiber installation appliance as in claim 4 further comprising mounting brackets disposed at a first end and a second end of said mounting member.

8. An optical fiber installation appliance as in claim 7 wherein said mounting brackets are non-rotably fixed on said first and second ends of said mounting member.

9. An optical fiber installation appliance as in claim 8 wherein said mounting brackets are attachable to said equipment rack.

10. An optical fiber installation appliance as in claim 8 wherein said mounting brackets are attachable to one or more walls of said equipment rack.

11. An optic fiber installation appliance as in claim 2 wherein said rings are composed of high density microcellular polyurethane.

12. An optical fiber installation appliance as in claim 1 wherein said rings are composed of a high density microcellular polyurethane.

13. An optical fiber installation appliance as in claim 12 wherein said high density microcellular polyurethane has a density of 15 lbs/ft$^3$ (240 kg/m$^3$) and a compression force deflection of 4–8 psi (27–55 kPa).

14. An optic fiber cable and optic fiber cable appliance installation produced by a process comprising the steps of a. cutting from a sheet material at least one shape selected from a group of shapes consisting of oval, circle, parabola, ring or ellipse;

b. cutting from said material a second shape, of larger surface area than said first shape;

c. alternately stacking said first and second shapes with coaxial alignment so as to form a said optic fiber cable appliance;

d. mounting said appliance on an equipment rack;

e. on at least one said first shape of said appliance disposing at least partially around thereon said optic fiber cable; and f. terminating at least one end of said optical fiber cable at a cable termination within said equipment rack.

15. An optic fiber installation appliance according to claim 14 wherein said process further comprises the step of cutting a hole in the center of said first and second shapes.

16. A fiber optic installation appliance according to claim 15 wherein said process further comprises the step of inserting a mounting member into said hole.

17. An optical fiber installation appliance according to claim 16 wherein said mounting member is a pipe adapted to be attachable to said equipment rack.

18. A method of installing optical fiber in an equipment installation comprising the steps of:

arranging one or more foam spacer rings alternately with one or more foam partition rings, said rings having respective central holes;

aligning said rings coaxially by said central holes;

securing said rings as a unitary assembly;

positioning said assembly proximate said equipment installation;

wrapping a length of said optical fiber around said spacer ring, between said partition rings wherein the ends of said optical fiber are connectable to intended terminal connections, and connecting said ends of said optical fiber to said terminal connections.

19. A method of installing optical fiber as in claim 18 further comprising the steps of introducing a mounting member through said respective central holes;

mounting said assembly on an equipment rack frame;

wrapping at least one additional optic fiber at least partially around another said spacer ring of said assembly; while maintaining at least one said foam partition ring between each said optical fiber.

\* \* \* \* \*